US011495849B2

(12) United States Patent
Wünsche et al.

(10) Patent No.: US 11,495,849 B2
(45) Date of Patent: Nov. 8, 2022

(54) BATTERY MODULE INCLUDING A HOUSING FLOOR WITH INTEGRATED COOLING

(71) Applicant: Samsung SDI Co., Ltd., Yongin-si (KR)

(72) Inventors: Ralph Wünsche, Graz (AT); Horst Krieger, St. Johann i.S. (AT); Oliver Stojanovic, Hausmannstätten (AT); Christian Kniepeiss, Schönegg (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 392 days.

(21) Appl. No.: 15/276,540

(22) Filed: Sep. 26, 2016

(65) Prior Publication Data

US 2017/0104252 A1 Apr. 13, 2017

(30) Foreign Application Priority Data

Oct. 7, 2015 (EP) .................................... 15/188771

(51) Int. Cl.
*H01M 10/6556* (2014.01)
*H01M 10/625* (2014.01)
(Continued)

(52) U.S. Cl.
CPC ..... *H01M 10/6556* (2015.04); *H01M 10/613* (2015.04); *H01M 10/625* (2015.04);
(Continued)

(58) Field of Classification Search
CPC .......... H01M 10/6556; H01M 10/658; H01M 10/613; H01M 10/647; H01M 10/625;
(Continued)

(56) References Cited

U.S. PATENT DOCUMENTS

2005/0168190 A1\* 8/2005 Gottsponer ........... H01M 50/30
320/107
2010/0247856 A1\* 9/2010 Vito ................... A63B 71/0054
428/138

(Continued)

FOREIGN PATENT DOCUMENTS

CN 102815203 A 12/2012
CN 203826453 U 9/2014
(Continued)

OTHER PUBLICATIONS

EPO Office Action dated Oct. 5, 2017, for corresponding European Patent Application No. 15188771.8 (6 pages).
(Continued)

*Primary Examiner* — Cynthia H Kelly
*Assistant Examiner* — Aaron J Greso
(74) *Attorney, Agent, or Firm* — Lewis Roca Rothgerber Christie LLP

(57) ABSTRACT

A battery module including a plurality of prismatic secondary battery cells, each of the battery cells including a bottom surface, and a housing for accommodating the battery cells and including a housing floor defining integral coolant channels for passage of coolant, the integral coolant channels being in thermal contact with the bottom surfaces of the battery cells.

10 Claims, 3 Drawing Sheets

(51) Int. Cl.
  *H01M 10/647* (2014.01)
  *H01M 10/613* (2014.01)
  *H01M 10/658* (2014.01)
  *H01M 50/20* (2021.01)

(52) U.S. Cl.
  CPC ....... *H01M 10/647* (2015.04); *H01M 10/658* (2015.04); *H01M 50/20* (2021.01); *H01M 2220/20* (2013.01)

(58) Field of Classification Search
  CPC ........... H01M 2/1077; H01M 2220/20; H01M 50/20; H01M 50/202; H01M 50/204; H01M 50/207; H01M 50/209; H01M 50/211; H01M 50/213; H01M 50/216; H01M 50/218; H01M 50/22; H01M 50/222; H01M 50/224; H01M 50/227; H01M 50/229; H01M 50/231; H01M 50/233; H01M 50/236; H01M 50/238; H01M 50/24; H01M 50/242; H01M 50/244; H01M 50/247; H01M 50/249; H01M 50/251; H01M 50/253; H01M 50/262; H01M 50/264; H01M 50/267; H01M 50/268; H01M 50/271; H01M 50/273; H01M 50/276; H01M 50/278; H01M 50/28; H01M 50/282; H01M 50/584; H01M 50/287; H01M 50/289; H01M 50/291; H01M 50/293; H01M 50/296; H01M 50/298; B60L 50/64
  See application file for complete search history.

(56) References Cited

U.S. PATENT DOCUMENTS

| | | |
|---|---|---|
| 2011/0132580 A1 | 6/2011 | Herrmann et al. |
| 2011/0244295 A1 | 10/2011 | Han et al. |
| 2012/0090907 A1* | 4/2012 | Store .................. B62D 21/00 180/68.5 |
| 2012/0231315 A1 | 9/2012 | Yoon |
| 2012/0312610 A1 | 12/2012 | Kim et al. |
| 2013/0084481 A1* | 4/2013 | Yoon ..................... H01M 50/20 429/99 |
| 2013/0153317 A1 | 6/2013 | Rawlinson et al. |
| 2014/0234691 A1* | 8/2014 | Lee ..................... H01M 10/625 429/120 |
| 2014/0342195 A1* | 11/2014 | Bhola ................ H01M 10/613 429/50 |
| 2015/0135940 A1* | 5/2015 | Rawlinson .............. F41H 7/042 89/36.08 |
| 2015/0171485 A1 | 6/2015 | Rawlinson |
| 2015/0171486 A1 | 6/2015 | Rawlinson |
| 2015/0214584 A1 | 7/2015 | Droste et al. |
| 2016/0285139 A1 | 9/2016 | Kimura |

FOREIGN PATENT DOCUMENTS

| | | |
|---|---|---|
| CN | 104733795 A | 6/2015 |
| CN | 204614833 U | 9/2015 |
| DE | 10 2008 034873 A1 | 1/2010 |
| DE | 10 2011 052513 A1 | 2/2013 |
| DE | 10 2014 200989 | 7/2015 |
| EP | 2 343 769 A1 | 7/2011 |
| EP | 2 608 311 A1 | 6/2013 |
| KR | 2016-0113990 | 10/2016 |
| WO | WO 2012/156363 A1 | 11/2012 |

OTHER PUBLICATIONS

EPO Extended Search Report dated Mar. 4, 2016, for corresponding European Patent Application No. 15188771.8 (5 pages).
EPO Office Action dated Mar. 9, 2017, for corresponding European Patent Application No. 15188771.8 (4 pages).
EPO Office Action dated May 17, 2018, for corresponding European Patent Application No. 15188771.8 (6 pages).
Chinese Office Action, with English translation, dated Sep. 3, 2020, issued in corresponding Chinese Patent Application No. 201610865472.2 (17 pages).
KR Office Action; Application No. 10-2016-0123230, dated Dec. 13, 2020, 5 pages.

* cited by examiner

BATTERY MODULE INCLUDING A HOUSING FLOOR WITH INTEGRATED COOLING

CROSS-REFERENCE TO RELATED APPLICATION

This application claims priority to, and the benefit of, European Patent Application No. 15188771.8, filed on Oct. 7, 2015, in the European Patent Office, the entire content of which is incorporated herein by reference in its entirety.

BACKGROUND

1. Field

Embodiments of the present invention relate to a battery module including a plurality of prismatic secondary battery cells.

2. Description of the Related Art

A rechargeable battery differs from a primary battery in that rechargeable batteries can be repeatedly charged and discharged. Primary batteries, on the other hand, only make an irreversible conversion of chemical to electrical energy. Low-capacity rechargeable batteries are used as a power supply for small electronic devices, such as cellular phones, notebook computers, and camcorders, while high-capacity rechargeable batteries are used as a power supply for driving motors in hybrid vehicles, and the like.

In general, rechargeable batteries include an electrode assembly including a positive electrode, a negative electrode, and a separator interposed between the positive and negative electrodes, a case receiving the electrode assembly, and an electrode terminal that is electrically connected to the electrode assembly. The case may have a cylindrical or rectangular shape, depending on a purpose of use of the rechargeable battery, and electrolyte solution is injected into the case for charging and discharging of the rechargeable battery through an electrochemical reaction of the positive electrode, the negative electrode, and the electrolyte solution.

Rechargeable batteries may be used as a battery module formed of a plurality of unit batteries coupled in series to be used for motor driving of a hybrid vehicle that requires high energy density. That is, the battery module is formed by connecting an electrode terminal of each of the unit batteries depending on the amount of power required for motor driving, such that a high-power rechargeable battery can be realized.

To safely use the battery module, heat generated from the rechargeable battery should be efficiently emitted, discharged, and/or dissipated. If the heat emission/discharge/dissipation is not sufficiently performed, a temperature variation occurs between the respective unit batteries, such that the battery module cannot generate a desired amount of power for motor driving. In addition, when the internal temperature of the battery is increased due to the heat generated from the rechargeable battery, an abnormal reaction occurs therein, and thus charging and discharging performance of the rechargeable deteriorates, and the lifespan of the rechargeable battery is shortened. Thus, a cooling device that can cool the rechargeable battery by effectively emitting/discharging/dissipating heat generated from the battery may be useful.

A device for cooling a vehicle battery may include a cooling plate having ducts through which a fluid may flow. The batteries are in thermal contact with the cooling plate, and heat can be transmitted from the batteries to the fluid. The cooling element that comprises the ducts is embodied as at least one extruded profile.

SUMMARY

Embodiments of the present invention provide a battery module.

A battery module of an embodiment of the present invention includes a plurality of prismatic secondary battery cells, each of the battery cells including a bottom surface, and a housing for accommodating the battery cells and including a housing floor defining integral coolant channels for passage of coolant, the integral coolant channels being in thermal contact with the bottom surfaces of the battery cells.

The housing floor may include extruded aluminum.

The battery module may further include connection joints at an outer surface of the housing floor that are respectively configured to connect the cooling channels with a supply line or a return line.

The battery cells may be in a row, and at least two of the coolant channels may be underneath the battery cells such that each of the bottom surfaces of the battery cells may be in thermal contact with the at least two of the coolant channels.

The battery module may further include a supplemental protection attached to an outer surface of the housing floor for protecting against a mechanical load.

The supplemental protection may include metal or a fiber composite material.

The battery module may further include a thermal insulation at an outer surface of the housing floor.

The thermal insulation may be located between the supplemental protection and the housing floor.

The thermal insulation may include aramid fiber.

The battery module may be included in a vehicle.

BRIEF DESCRIPTION OF THE DRAWINGS

Example embodiments will now be described more fully hereinafter with reference to the accompanying drawings, in which.

DETAILED DESCRIPTION

Figure 1:
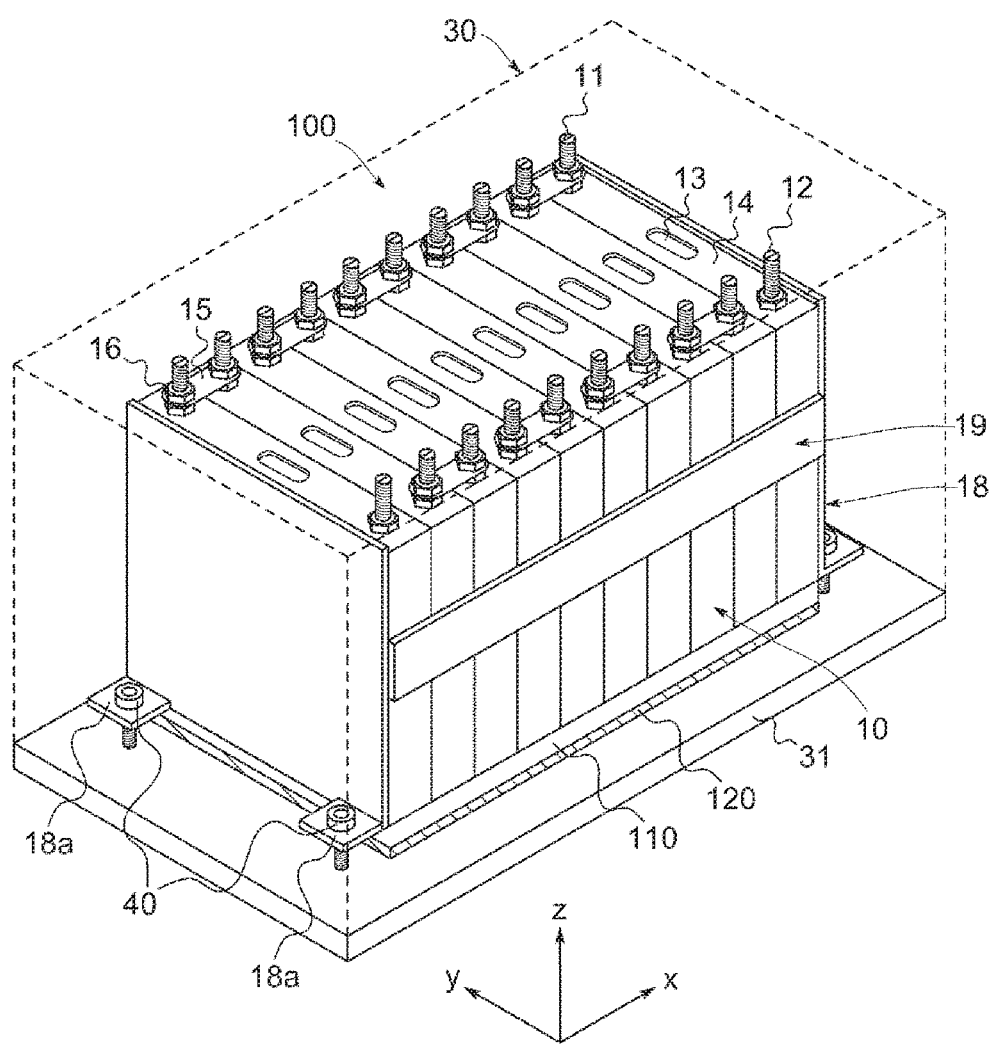
FIG. 1 is a perspective view of a conventional battery module.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to one "or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Referring to FIG. 1, an embodiment of a conventional battery module 100 includes a plurality of battery cells 10 aligned in one direction, and a heat exchange member 110 adjacent a bottom surface of the plurality of battery cells 10. A pair of end plates 18 are provided to face wide surfaces of the battery cells 10 at an outside of the plurality of battery cells 10, and a connection plate 19 is configured to connect the pair of end plates 18 to each other, thereby fixing the plurality of battery cells 10 together. Fastening portions 18a on both sides of the battery module 100 are fastened to a support plate 31 by bolts 40. The support plate 31 is part of a housing 30.

Here, each battery cell 10 is a prismatic (or rectangular) cell, the wide flat surfaces of the battery cells 10 being stacked together to form the battery module 100. Further, each battery cell 10 includes a battery case configured to accommodate an electrode assembly and an electrolyte. The battery case is hermetically sealed by a cap assembly 14. The cap assembly 14 is provided with positive and negative electrode terminals 11 and 12 having different respective polarities, and a vent 13. The vent 13 is a safety means of the battery cell 10, which acts as a passage through which gas generated in the battery cell 10 is exhausted to the outside of the battery cell 10. The positive and negative electrode terminals 11 and 12 of neighboring battery cells 10 are respectively electrically connected through a bus bar 15, and the bus bar 15 may be fixed by a nut 16 or the like. Hence, the battery module 100 may be used as power source unit by electrically connecting the plurality of battery cells 10 as one bundle.

Generally, the battery cells 10 generate a large amount of heat while being charged/discharged. The generated heat accumulates in the battery cells 10, thereby accelerating deterioration of the battery cells 10. Therefore, the battery module 100 may further include a heat exchange member 110, which is provided adjacent the bottom surfaces of the battery cells 10 to cool down the battery cells 10. In addition, an elastic member 120 made of rubber or made of other elastic materials may be interposed between the support plate 31 and the heat exchange member 110.

The heat exchange member 110 may include a cooling plate having a size corresponding to that of the bottom surface of the plurality of battery cells 10, e.g., the cooling plate may completely overlap a collective entirety of the bottom surfaces of all of the battery cells 10 in the battery module 100. The cooling plate may include a passage through which a coolant may move. The coolant performs a heat exchange with the battery cells 10 while circulating inside the heat exchange member 110, i.e., inside the cooling plate.

Figure 2:
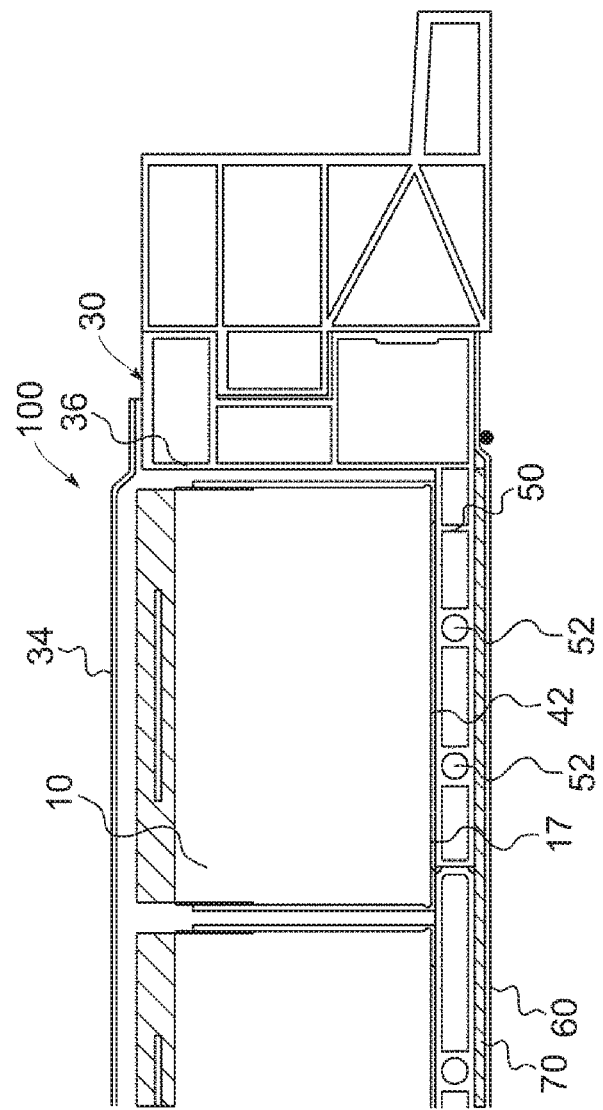
FIG. 2 is a partial cross-sectional view of a battery module according to an embodiment of the present invention.

FIG. 2 is a partial cross-sectional view of a battery module 100 according to an embodiment of the present invention. Similar to the conventional embodiment illustrated in FIG. 1, the battery module 100 of the present embodiment of the present invention includes a plurality of battery cells 10, which are arranged in rows such that wide flat surfaces of respective adjacent battery cells 10 face each other. A bottom surface 17 of each battery cell 10 rests upon a housing floor 50, which is part of a housing 30 for accommodating the battery cells 10. A thermal contact between the bottom surface 17 and the housing floor 50 may be improved by means of a thermal pad 42. The housing 30 further includes a cover 34 and side walls 36. In the present embodiment, the housing floor 50 includes extruded aluminum sheath.

Thus, the housing 30 of the battery module 100 may include the rigid housing floor 50, which involves integrated hollows, or channels, used as coolant channels 52. The upper surface of the rigid housing floor 50 serves as a cooling plate. That is, the prismatic secondary battery cells 10 are arranged on top of the housing floor 50, and are thermally connected to the upper surface of the housing floor 50. A lower surface of the housing floor 50 forms an end of the integrated hollows, and provides improved mechanical stability against mechanical load (e.g., weight and shock), and thereby acts as a support plate. In summary, the housing floor 50 may include a heat exchange member, namely the cooling plate and the cooling channels. These two parts of the heat exchange member and a support plate form an element (e.g., an integral, or one-piece, element) of the housing 30 (e.g., the housing floor 50).

Hence, in the present embodiment, a number of prismatic secondary battery cells 10 are bundled in a row, and two or more coolant channels 52 are positioned underneath the row such that each bottom surface 17 of the battery cells 10 is in thermal contact with the coolant channels 52. One of the coolant channels 52 may be connected with a supply line for the coolant, and the other coolant channel 52 may be connected with a return line for the coolant.

A supplemental protection (e.g., underbody protection) 60 protects against mechanical load (e.g., shock and weight), and is attached to an outer surface of the housing floor 50. The supplemental protection 60 may be made of metal or a fiber composite material. Further, a thermal insulation 70, which may be made of aramid fiber, may be provided between the supplemental protection 60 and the housing floor 50, although the present invention is not limited thereto.

Figure 3:
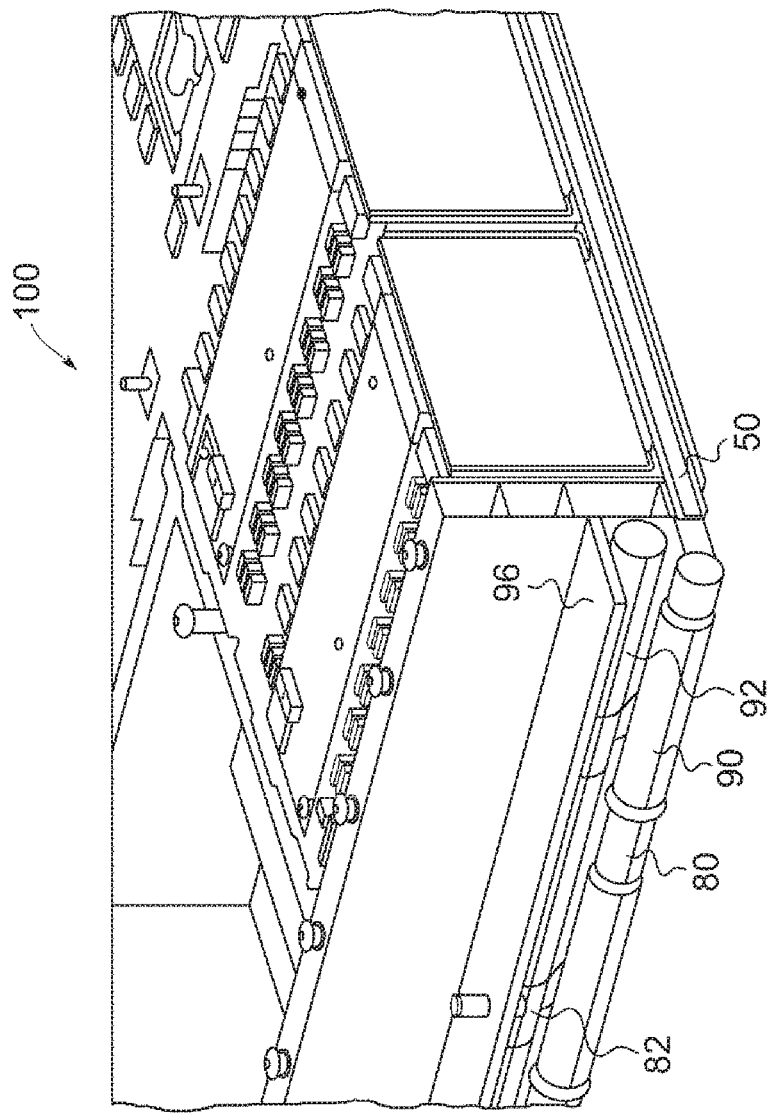
FIG. 3 is a partial perspective view of a battery module according to an embodiment of the present invention.

FIG. 3 is a partial perspective view of a battery module according to an embodiment of the present invention. The battery module 100 of the present embodiment is similar to the battery module 100 of the previously described embodiment illustrated in FIG. 2, with the exception that connection joints 80, 82 that are configured to respectively connect the cooling channels 52 with a supply line 90 and a return line 92 are positioned at an outer surface of the housing floor 50. Here, a separate mechanical protection 96 for the connection joints 80, 82, the supply line 90, and the return line 92 is provided.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and their equivalents.

What is claimed is:

1. A battery module comprising:
a plurality of prismatic secondary battery cells, each of the battery cells comprising a bottom surface;
a housing for accommodating the battery cells and comprising a housing floor defining integral coolant channels for passage of coolant, the integral coolant channels being in thermal contact with the bottom surfaces of the battery cells;
a supply line or a return line outside of the housing, coupled to the coolant channels, and extending parallel to the housing along a side of the housing; and
a separate mechanical protection coupled substantially perpendicularly to an outer surface of the housing, and extending along a length of the supply line or the return line for protecting the supply line or the return line,
wherein the separate mechanical protection and the outer surface of the housing are at respective orthogonal sides of the supply line or the return line,
wherein the mechanical protection is above the supply line or the return line at an exterior of the housing,
wherein the supply line or the return line is between the mechanical protection and a bottom surface of the housing in a vertical direction,
wherein the mechanical protection is spaced away from top and bottom edges of the outer surface of the housing in the vertical direction, and
wherein the outer surface of the housing comprises a single, continuous, unitary piece of material.

2. The battery module of claim 1, wherein the housing floor comprises extruded aluminum.

3. The battery module of claim 1, further comprising connection joints at an outer surface of the housing floor that are respectively configured to connect the coolant channels with the supply line or the return line.

4. The battery module of claim 1, wherein the battery cells are in a row, and wherein at least two of the coolant channels are underneath the battery cells such that each of the bottom surfaces of the battery cells are in thermal contact with the at least two of the coolant channels.

5. The battery module of claim 1, further comprising a supplemental protection attached to an outer surface of the housing floor for protecting against a mechanical load.

6. The battery module of claim 5, wherein the supplemental protection comprises metal or a fiber composite material.

7. The battery module of claim 5, further comprising a thermal insulation at the outer surface of the housing floor.

8. The battery module of claim 7, wherein the thermal insulation is located between the supplemental protection and the housing floor.

9. The battery module of claim 7, wherein the thermal insulation comprises aramid fiber.

10. A vehicle comprising the battery module of claim 1.

* * * * *